United States Patent [19]
Kalnitsky et al.

[11] Patent Number: 6,011,859
[45] Date of Patent: *Jan. 4, 2000

[54] SOLID STATE FINGERPRINT SENSOR PACKAGING APPARATUS AND METHOD

[75] Inventors: Alexander Kalnitsky, San Francisco; Alan Kramer, Berkeley, both of Calif.

[73] Assignee: STMicroelectronics, Inc., Carrollton, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,204

[22] Filed: Jul. 2, 1997

[51] Int. Cl.$^7$ .................................................. G06K 9/00
[52] U.S. Cl. ............................................ 382/124; 382/100
[58] Field of Search ..................................... 382/124, 115, 382/100; 340/825.34, 825.3, 825.31, 825.32, 825.33, 146.3; 257/415, 417

[56] References Cited

U.S. PATENT DOCUMENTS

| | | | |
|---|---|---|---|
| 4,353,056 | 10/1982 | Tsikos | 340/146.3 |
| 4,394,773 | 7/1983 | Ruell | 382/124 |
| 4,577,345 | 3/1986 | Abramov | 382/124 |
| 5,325,442 | 6/1994 | Knapp | 382/124 |
| 5,373,181 | 12/1994 | Scheiter et al. | 257/415 |

OTHER PUBLICATIONS

"Integrated Tactile Imager with an Intrinsic Contour Detection Option", *Sensor and Actuators*, Jan./Feb. 1989, No. 1/2 pp. 141–153.

"Novel Fingerprint Scanning Arrays Using polysilicon TFT's of Glass and Polymer Substrates," IEEE Electron Device Letters, V. 18, No. 1, Jan., 1997, pp. 19–20.

"A 390DPI Live Fingerprint Imager Based on Feedback Capacitive Sensing Scheme," 1997 IEEE International Solid–State Circuits Conference, 1997, p. 200.

*Primary Examiner*—Jose L. Couso
*Assistant Examiner*—Duy M. Dang
*Attorney, Agent, or Firm*—Theodore E. Galanthay; Lisa K. Jorgenson; Andre Szuwalski

[57] ABSTRACT

A planar, capacitive-type, rectangular, and multi-pixel fingerprint sensing array is mounted on the horizontal and generally rectangular top-surface of a dome that extends upward generally from the center of a horizontally disposed and generally rectangular silicon substrate member. The dome is formed by four upward extending and inclined, or tapered, side wall surfaces, at least one wall surface of which carries electrical circuit paths that electrically connected to the various circuit elements of the sensing array. A generally rectangular, encircling and wall-like card carrier assembly includes a generally horizontal upper-surface having a generally centered opening through which only the dome and sensing array project upward. The bottom-surface of the card carrier assembly is mounted to edge portions of the silicon substrate member in a manner to surround and protect all but the upward extending dome. A flexible membrane or laminate is sealed to the top-surface of the card carrier assembly to form a flexible surface over the sensing array. The card carrier assembly includes a circuit path having an external portion and having an internal portion that connects to the wall-mounted internal electrical circuit paths, the external portion providing external connection to the internal sensing array.

20 Claims, 4 Drawing Sheets

SOLID STATE FINGERPRINT SENSOR PACKAGING APPARATUS AND METHOD

CROSS-REFERENCE TO RELATED APPLICATIONS

Figure 1:
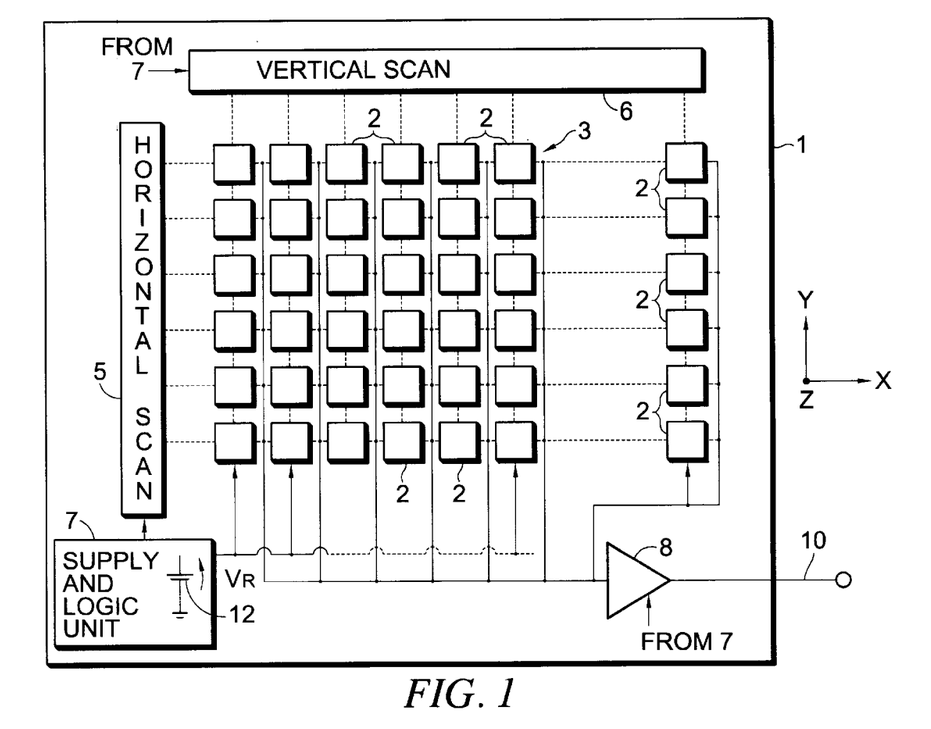
FIG. 1 is a top view, taken in the X-Y plane, of a generally planar, multiple pixel, multiple row/column, distance sensing array with which the present invention find utility, this array having a plurality of solid state capacitive sensors that operate in combination to provide an electrical output that comprises a multiple pixel fingerprint pattern in accordance with this invention.
Figure 2:
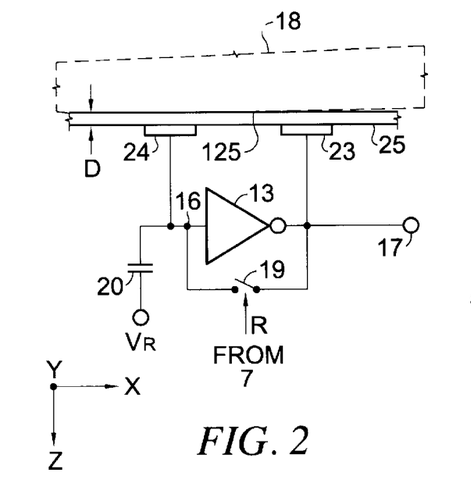
FIG. 2 schematically shows the circuitry of a single cell of the FIG. 1 array, all array cells of FIG. 1 being generally identical in their physical and electrical construction and arrangement.
Figure 3:
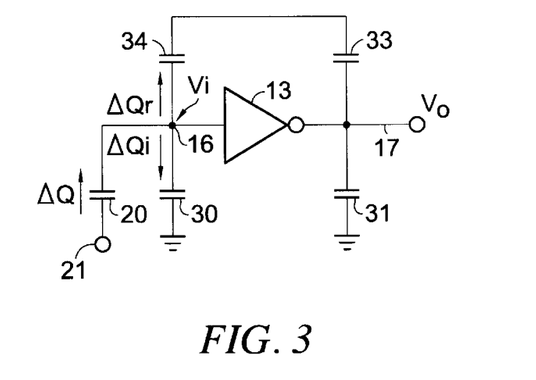
FIG. 3 shows the equivalent circuit of the single cell circuit that is shown in FIG. 2.

U.S. patent application Ser. No. 08/799,548 by Marco Tartagni, filed Feb. 13, 1997, and entitled CAPACITIVE DISTANCE SENSOR is incorporated herein by reference. This application describes an Integrated Circuit (IC) capacitive distance sensor having a number of uses, including fingerprint acquisition. In this IC device, a portion of which is shown in FIGS. 1–3 hereof, each individual cell 2 of a multi-cell array 3 includes a pair of flat armatures 23,24 that are spaced from each other in a horizontal plane to form a capacitor and to define a distance "d" to be measured. Each cell 2 also includes the FIG. 2 amplifier means whose input 16 is connected to one armature 24 and whose output 17 is connected to the other armature 23, such that the armature/capacitor comprises the negative amplifier feedback circuit 17,23,25,18,24,16.

BACKGROUND OF THE INVENTION

1. Field of the Invention

This invention relates to the field of fingerprint image sensing, acquisition, or detection, that is, to the detection of a fingerprint's minutiae such as ridge endings and bifurcations. More specifically, this invention relates to a solid state, multi-pixel, capacitance type, fingerprint sensor having a new and unusual packaging construction and arrangement.

2. Description of the Related Art

As is well known, the fingerprint of a human is composed of lines or ridges, which have both branching parts or bifurcations and abrupt endings or end points. These branching parts, bifurcations, endings, and end points are also known as minutiae. Fingerprints are identified by the locations of, and the relationships among, these minutiae.

While fingerprint detection is traditionally used in crime detection, fingerprint detection also finds utility as a personal key or signature; for example, to improve the safety of credit card use, to control access to secure areas, computers and banking system, and as a substitute for house or car keys.

The present invention relates to a capacitance distance/fingerprint sensor, such as is described in the above mentioned related patent application, that is packaged in accordance with this invention in a unique manner. The general use of capacitance type sensors is generally known.

For example, the publication SENSORS AND ACTUATORS, January/February 1989, no. 1/2, at pages 141–153, contains an article entitled INTEGRATED TACTILE IMAGER WITH AN INTRINSIC CONTOUR DETECTION OPTION that was presented at the Fourth International Conference on Solid-State Sensors and Actuators (Transducers '87), Tokyo, Japan, Jun. 2–5, 1987. This article describes an integrated capacitive tactile imaging sensor that comprises a multi-layer construction having a bottom ceramic support, a 9-row/9-column array of square aluminum electrodes that are contained on a silicon wafer integrated circuit, a flexible and isolating intermediate layer that is made up of natural rubber, a thin conductive rubber layer, and a top protective layer. In this device, capacitance depends upon local deformation of the natural rubber layer. The 81 individual aluminum electrodes of this device provide capacitive measurement of an indentation pattern within the natural rubber layer, this indentation being caused by a pressure distribution that acts on the top protective layer.

The use of a capacitance type sensor to sense the minutiae of a fingerprint is also known.

For example, the publication IEEE ELECTRON DEVICE LETTERS, VOL. 18, NO. 1, JANUARY 1997, pages 19–20, contains an article entitled NOVEL FINGERPRINT SCANNING ARRAYS USING POLYSILICON TFT'S OF GLASS AND POLYMER SUBSTRATES. This article describes a two-dimensional (2-D), 200×200, capacitance sensing array that is made up of 40,000 individual pixels. Each pixel of the array includes two Thin Film Transistors (TFTs) and a capacitor plate. Each array pixel resides at the intersection of an array-row and an array-column, and each array pixel is individually addressable by way of row-driver circuits and column-driver circuits.

Considering the two TFTs, hereinafter called TFT-A and TFT-B, that are associated with a given pixel, the drain electrodes of TFT-A and TFT-B are connected to the pixel's capacitor plate, the gate electrode and the source electrode of TFT-A are connected to a row-conductor that is associated with the pixel, the gate of TFT-B is connected to the following row-conductor, and the source of TFT-B is connected to a column-conductor that is associated with the pixel.

A thin (0.1 micrometer) silicon nitride insulator overlies the capacitor plate of each array pixel. When the ridge of a fingerprint lies directly over the capacitor plate, a capacitor is formed between the capacitor plate and the finger. This capacitor is charged when a row-pulse (8 to 10 VDC, and of 10 to 100 micro second duration) is applied to the pixel by way of the row-conductor that is associated with this pixel and TFT-A. This stored charge is thereafter transferred onto the pixel's column-conductor through TFT-B when a row-pulse is applied to the following row-electrode.

Also of interest is the publication 1997 IEEE INTERNATIONAL SOLID-STATE CIRCUITS CONFERENCE that contains and article beginning page 200 entitled A 390DPI LIVE FINGERPRINT IMAGER BASED ON FEEDBACK CAPACITIVE SENSING SCHEME. This article describes a single-chip, 200×200 element array, 2-metal digital CMOS technology, sensor that is based upon feedback capacitance sensing, and that operates to detect the electrical field variation that is induced by the finger's skin surface. In each element of the array two horizontally spaced metal plates are separated from the overlying and adjacent portion of the finger's skin surface by passivation oxide. Since the distance between the skin and the sensor's surface identifies the presence of the fingerprint's ridges and valleys, an array of elements provides a complete fingerprint pattern.

In each element of the array, the two metal plates are respectively connected to the input and the output of a high-gain inverter, to thereby form a charge-integrator. In operation, the charge-integrator is first reset by shorting the input and output of the inverter. A fixed amount of charge is then sinked from the input, causing the output voltage to swing inversely proportional to a feedback capacitance value that is inversely proportional to the distance to the fingerprint's ridges and valleys. The array of cells or sensors thus provides the complete fingerprint pattern. The fingerprint image disappears when the finger is removed from the array.

U.S. Pat. No. 4,353,056, incorporated herein by reference, is of interest in that it relates to a capacitance-type fingerprint sensor wherein a finger is pressed onto the sensor's surface in order to read the ridges and valleys of the fingerprint. The sensor-surface has a large number of capacitors of a small physical size associated therewith. Two sensors are described. In a first type of sensor, an electrical insulator carries a number of flexible and horizontally spaced curved metal electrodes, two adjacent metal electrodes of which comprise one capacitor. A protective insulating film overlies the electrical insulator, and when a finger is brought into physical contact with this protective insulating film, the metal electrodes are physically deformed, thereby selectively changing the capacitance of the large number of capacitors in accordance with the fingerprint's ridge/valley pattern. In a second type of sensor, the top surface of a rigid support carries a number of horizontally spaced and flat metal electrodes in a fixed position. Placed above the plane of the metal electrodes is the sequential arrangement of a flexible insulator, a flexible electrode, and a flexible protective membrane. A capacitor is formed between the top flexible electrode and each of the lower and fixed-position flat metal electrodes. When the end of a finger is brought into contact with the flexible membrane, the flexible electrode becomes wavy in accordance with the fingerprints' ridges/valleys pattern.

In addition, U.S. Pat. No. 5,325,442, incorporated herein by reference, relates to a capacitance-type fingerprint sensor having a sensing pad that comprises a planar array of row/column sensing elements having a pitch of about 100 micrometers. Each sensing element is located at the intersection of a row conductor and a column conductor, and in each sensing element, a sensing capacitor is made up of a planar sensing electrode that is spaced from a finger surface by way of an insulating film that overlies the sensing electrode. The plurality of sensing electrodes that make up the array are regularly spaced and re equal size rectangles.

The sensing elements are fabricated using photolithographic processes, and each individual sensing element includes a Thin-Film-Transistor (TFT) in the form of a Field-Effect-Transistor (FET). Each FET gate is connected to a row conductor, each FET source is connected to a column conductor, and each FET drain is connected to a sensing electrode.

In one embodiment, each sensing element comprises a sensing capacitor that is formed between a sensing electrode and the finger. In another embodiment, each sensing element includes an electrically isolated and conducting pad that is physically engaged by the finger.

While prior devices as above described are generally useful for their limited intended use, a need remains in the art for a solid state capacitance type fingerprint sensing array, wherein the sensor array is assembled or packaged, generally using solid state processing techniques, in a manner that enhances the operation of the sensor array, and at the same time prevents or minimizes contamination and the like when a finger is brought into physical contact with the active upper surface of the sensor array.

SUMMARY OF THE INVENTION

The present invention provides a uniquely packaged Integrated Circuit (IC) array of capacitive sensor cells that collectively operate to sense or detect the fingerprint pattern of a fingertip that is physically placed upon the top surface of the package. The IC array is generally rectangular and planar, and the IC array contains a relatively large number of individual sensor cells, or pixels, that are located within the multiple rows and the multiple columns of the array.

The internally housed IC array projects to the top surface of the package, where the array is covered by, and protected by, a flexible membrane having a low dielectric constant, thus providing easy access to a fingertip during operation thereof to detect a fingerprint pattern.

In an embodiment of the invention, each individual sensor cell of the IC array includes a signal-inverting circuit whose input/output is bridged by a normally open reset switch in the form of a MOS transistor. Each sensor cell also includes a pair of flat or planar, horizontally spaced, and generally topmost-level metal plates. These two metal plates electrically cooperate with the fingertip skin to form two series connected capacitors that provide negative feedback from the output to the input of the signal-inverting circuit, this negative feedback being a function of the proximity of distance of that cell's skin portion to that cell's metal plates.

In operation, all sensor cells are first discharged by momentarily closing all of the reset switches, one switch for each sensor cell. The fingertip is then physically placed on the array's top passivated surface. The presence of the fingerprint's skin ridges across various ones of the metal plate pairs, one pair for each sensor pixel or sensor cell, induces an enhanced capacitive coupling between these various ones of the plate pairs, as compared to other plate pairs that are associated with a fingerprint valley. The fingerprint pattern is then digitized by sensing the difference in adjacent pixel capacitance values.

Since the fingertip must be brought directly into the physical proximity of the array's top surface, conventional packaging techniques are not generally suitable for packaging the array. The apparatus/method of the present invention will be explained relative to packaging that includes two vertically oriented and wall-like chip card carriers. However, the present invention also finds utility in applications that require stationary installation of the sensor array.

The present invention provides a packaging construction and arrangement having a horizontal top surface topography that allows internal solder bonding pads and internal circuit paths to be physically isolated, physically protected, and placed at a desired distance below the sensor's top fingertip contacting surface, and generally under an upper chip card carrier that encircles and overlies a border portion of the top surface topography.

This result is achieved by thinning down the four edges, or boarders, of the top surface of a generally rectangular silicon substrate whose center located, generally rectangular, and upward-extending dome shaped flat top surface carries the above-described multiple cell array. This construction and arrangement provides a well tapered silicon substrate top surface transition region that exists between the edge located and thin substrate region and the center located and dome shaped thick substrate region, thereby allowing for reasonable film step coverage over this thin/tapered/thick substrate top surface topography during processing.

The top surface of the substrate is covered by an intermetal dielectric layer, and electrical connections are made to the sensor array by way of one, or more, metal conductor paths that extend over this planarization layer from the silicon substrate's thin region upward along the silicon substrate's tapered region, to electrically terminate and connect to the border or edge of the top located sensor array.

A passivation layer is placed on top of the silicon substrate, sensor array, planarization layer, and electrical connection assembly.

The generally flat bottom horizontal surface of the silicon substrate is supported by the top horizontal surface of a somewhat larger and generally complementary and rectangular support laminate that is made of a rigid and electrically nonconductive plastic. The silicon substrate is generally centered upon the top surface of this support laminate, and a generally rectangular and two piece chip carrier wall-like structure is supported by, and sealed to, the exposed top surface of this support laminate, so as to encircle and protect the silicon substrate, so as to overhang the thin portion of the silicon substrate, and so as to provide a relatively small, center disposed, and generally rectangular opening through which only the silicon substrate's center-located dome and it sensor array upwardly project to be generally coincident with the top of the surrounding wall-like structure.

A thin, generally rectangular, flexible, low dielectric constant, and electrically nonconductive protective laminate is bonded to the top of the chip carrier wall-like structure, to thereby seal the assembly from contaminants and the like.

The chip carrier wall-like structure is made up of a large-area lower member and a smaller-area upper member. Electrical connection to the array is provided by way of an internally exposed and externally exposed metal layer that is located between the lower and upper members.

An object of this invention is to provide a solid state fingerprint sensor packaging apparatus/method having a planar, generally rectangular, and multi-pixel fingerprint sensing array that is mounted on a horizontal and generally rectangular top-surface of a dome that extends upward generally from the center of a horizontally disposed and generally rectangular silicon substrate member. The dome is formed by four upward-extending and inclined, or tapered, side wall surfaces, at least one wall of which carries electrical circuit paths that connected to the sensing array. A generally rectangular wall-like card carrier assembly encircles the substrate member. The card carrier assembly includes a generally horizontal upper-surface with a generally centered opening through which only the dome and sensing array are physically accessible. The bottom-surface of the card carrier assembly is mounted to edge portions of the silicon substrate member in a manner to surround and protect all but the upward extending dome. A very thin flexible membrane, or laminate, having a low dielectric constant is sealed to the top-surface of the card carrier assembly to form a flexible and protective layer over the sensing array. This flexible membrane is in intimate physical contact with the top surface of the array. The intimate contact and low dielectric constant characteristics of the flexible membrane allow a fingertip to easily modulate the capacitance values of the array pixels.

The card carrier assembly includes circuit paths having external portions, and having internal portions that connect to the internal electrical circuit paths, the external portions serving to provide external connection to the internally housed sensing array.

These and other objects, features and advantages of the present invention will be apparent to those of skill in the art upon reference to the following detailed description, which description makes reference to the drawing.

DESCRIPTION OF THE PREFERRED EMBODIMENTS

FIG. 1 is a top view of an IC device 1 that includes a generally planar, multiple pixel, multiple row/column, array 3 having a relatively large number of solid state capacitive sensor cells 2 that operate in accordance with an aspect of this invention to provide an electrical output 10 that comprises a multiple pixel fingerprint pattern. As shown, FIG. 1 is taken in the X-Y plane. Array 3 contains the number N of horizontal or X-direction extending rows of individual capacitance sensor cells 2, each row having the number M of individual sensor cells 2 therein, and array 3 contains the number M of vertically or Y-direction extending columns of individual capacitance sensor cells 2, each column having the number N of individual sensor cells 2 therein, wherein the numbers N and M are integers that may or may not be equal to each other. The number of individual picture elements, pixels, or cells 2 within array 3 is quite large, and equals the product of M×N. An example is 512×512 pixels or cells 2 within array 3, array 3 being of a physical size of about 20 mm to about 25 mm.

The present invention deals with a solid state packaging apparatus/method whereby array 3, including its many individual sensing cells 2, is assembled or packaged, generally using solid state processing techniques, in a manner that enhances the operation of array 3, and at the same time, prevents or minimizes grease, moisture, and condensation contamination and the like when fingertip 18 of FIG. 2 is brought into physical contact with the upper and active surface 125 of array 3.

Each individual sensor cell 2 within array 3 is addressable by virtue of the cell being physically located at the intersection of a row/column of array 3. The manner in which the individual sensor cells 2 of array 3 are addressed and readout in order to digitize a fingerprint pattern are well known to those of skill in the art and does not form a limitation on this invention.

FIG. 1 shows an integrated circuit chip device 1 that is to be packaged in accordance with the present invention. IC device 1 includes a horizontal scanning stage or network 5, and a vertical scanning stage or network 6 for sequentially interrogating or reading one cell 2 at a time, according to a predetermined scanning pattern. Preferably, stages 5 and 6 comprise shift registers, or decoders, that operate to interrogate the FIG. 2 outputs 17 of cells 2 sequentially.

IC device 1 also includes a supply/logic stage or network 7 that operates to supply the IC device components, including all cells 2, with the necessary operating voltages, and to control the sequence of steps that are necessary for operation of IC device 1. In particular, a DC voltage source 12 provides a DC reference voltage Vr. A buffer 8 is connected to the outputs 17 of all cells 2. Output 10 of buffer 8 comprises the sequentially arranged output of IC device 1, the signal at output 10 being controlled by operation of scanning stages 5 and 6.

FIG. 2 schematically shows the circuit of a single cell 2 of FIG. 1's array 3, all cells 2 being generally identical in construction and arrangement. Each cell 2 includes a low-power, signal inverting, amplifier 13 having an exemplary gain of from about 1000 to about 2000. Terminal 21 comprising the input to the circuit of cell 2, and terminal 21 and input capacitor 20 connect to input 16 of amplifier 13. Terminal 17 comprises the output of cell 2 and amplifier 13. Each cell 2 also includes two X-Y planar armatures or metal capacitor plates 23,24 that are of generally equal area and are horizontally or X-direction spaced from each other within a common X-Y horizontal plane. A thin dielectric layer 25 covers capacitor plates 23,24, and the upper horizontal surface 125 of layer 25 provides an active array surface for physical contact by the skin surface 18 of a finger whose fingerprint is to be sensed or determined. Dielectric layer 25 may cover the entire face of the upper portion of IC device 1 that includes array 3 and its individual cells 2.

In use, a fingertip 18 is placed on the upper surface 125 of array 3's dielectric layer 25. Skin surface 18 thereby forms an armature, or electrode, that vertically overlies and faces the top, X-Y planar, surfaces of capacitor plates 23,24. Skin surface 18 operates to define with plates 23,24 the first capacitor 34 of FIG. 3, and the second capacitor 33 of FIG. 3, which series connected compound capacitors 33,34 are connected in negative feedback fashion from amplifier output 17 to amplifier input 16.

Each cell 2 also includes a normally open start, reset, or control switch 19, preferably in the form of a MOS switch. Switch 19 selectively and momentarily operates to short amplifier input 16 to amplifier output 17. Switch 19 is controlled by a control signal "R" that is provided by FIG. 1's supply and logic unit 7. At the start of a fingerprint acquisition operation, switches 19 of all array cells 2 are momentarily closed, and the voltage level at all cell inputs 21 is maintained at a constant magnitude. In this way, the input voltage of all cells 2 is brought to the same potential as the cell's output voltage.

Shortly thereafter, supply and logic unit 7 operates to open all reset switches 19, and to supply all cell inputs 21 with a step voltage that is equal in magnitude to reference voltage Vr. An electrical charge is now induced at each of the cell input capacitors 20, thus permitting the reading of the local and individual Z-direction cell distances "d" that exist between a cell's capacitor plates 23,24 and that cell's overlying skin surface 18.

Scanning stages 5,6 of FIG. 1 now operate to sequentially enable the reading, or interrogation, of the many cells 2 within array 3. In this way, buffer 8 operates to sequentially provide an output 10 in the form of a sequence of gray levels of voltage that provide a three-dimensional readout and display of the skin surface 18 of the finger that is currently resident on the top surface 125 of array 3.

FIG. 3 is an equivalent circuit of the single cell circuit shown in FIG. 2. The input capacitance of amplifier 13 is shown at 30, the output capacitance of amplifier 13 is shown at 31, and the two above mentioned series connected and skin-sensitive capacitors are shown at 33,34.

Figure 4:
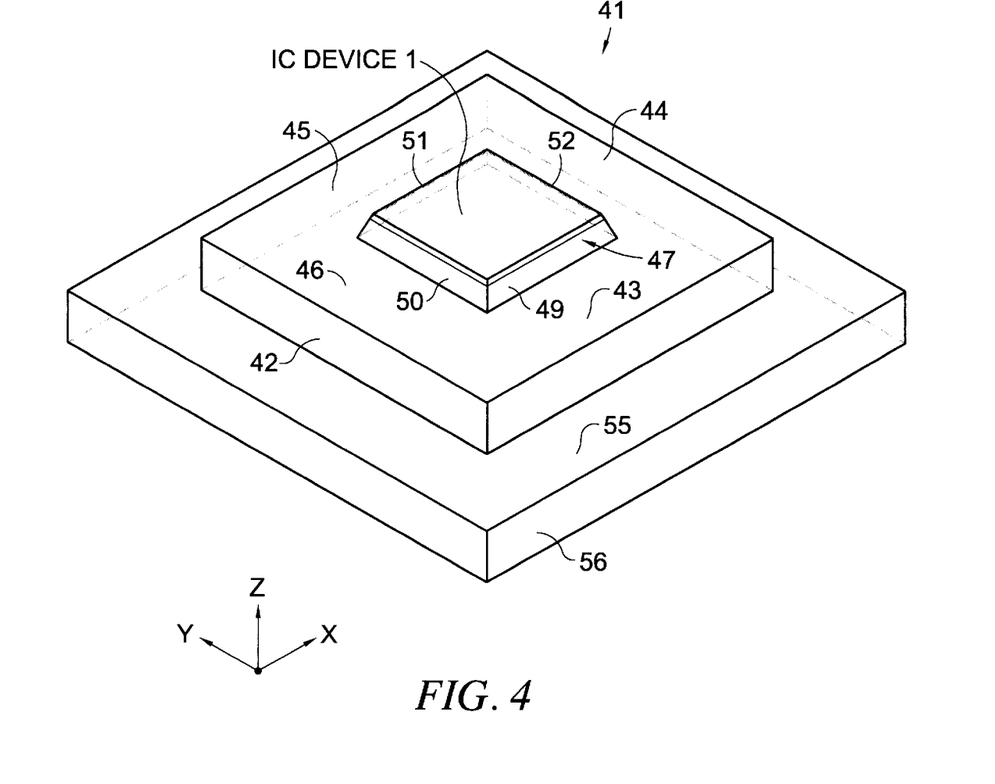
FIG. 4 is a top perspective view of the bottom silicon substrate portion of a packaging apparatus in accordance with this invention.
Figure 5:
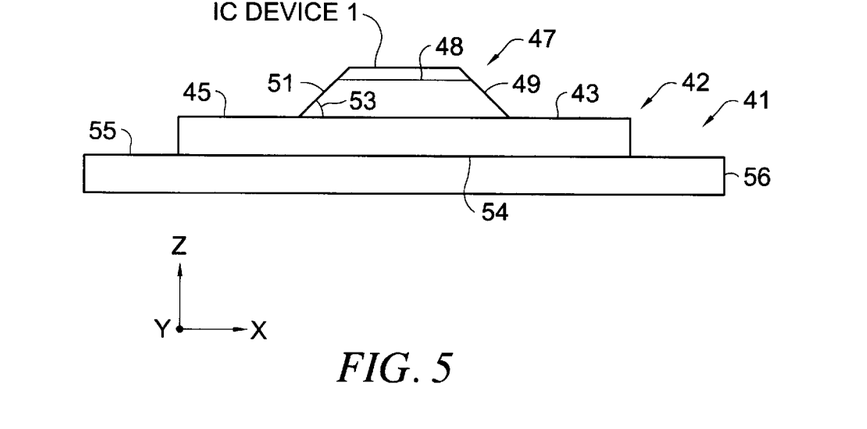
FIG. 5 is a side view of FIG. 4.

FIG. 4 is a top perspective view of the bottom substrate portion 41 of a solid state packaging apparatus in accordance with this invention, and FIG. 5 is a side view of bottom portion 41.

Reference numeral 42 identifies a generally rectangular silicon substrate member having a flat or horizontal bottom surface 54. As shown in FIGS. 4 and 5, a portion of the top surface of silicon substrate 42 has been processed in a well-known manner to thin down the four edges or borders 43–46 thereof. These four edge portions 43–46 are coplanar and generally horizontal. In this manner, a generally center located, upward extending, and generally rectangular-top dome 47 is provided. Dome 47 has a flat and generally horizontal top surface 48 that is preferably of a complementary area to the X-Y planar area of IC device 1, and that carries IC device 1 and its multiple cell array 3. As will be apparent to those of skill in the art, IC device 1 may be formed integrally with silicon substrate member 41, or IC device 1 may be a separate device that is mounted on, and secured to, the top surface of the substrate's center located an upward extending dome 47. In a preferred embodiment of the invention, substrate surfaces 54 and 48 were parallel, and substrate surfaces 43–46 were coplanar and parallel with surfaces 54,58.

This unique construction and arrangement provides silicon substrate 42 with a well tapered top surface transition region that is formed by the four upward tapered walls 49–52 that exist between the horizontal edge located and thin substrate region 43–46 and the horizontal, center-located, and dome shaped thick substrate region 47, thereby allowing for reasonable film step coverage over the thin/tapered/thick top surface topography of silicon substrate 42 during processing. Reference numeral 53 identifies the angle at which all four of the walls 49–52 are inclined or tapered relative to the X-Y plane. This angle may be in the range of from about 30 to about 70-degrees.

The generally flat bottom surface 54 of silicon substrate 42 is supported by the generally flat top surface 55 of a somewhat larger and generally complementary rectangular support laminate member 56 that is made of a rigid and electrically nonconductive plastic. As shown, silicon substrate 42 is generally centered upon the top surface 55 of support laminate 56. By way of example, support laminate 56 is from about 30 mm square up to a size that is generally equal to that of well known credit cards.

As will be apparent, the upward-extending dome 47 of silicone substrate member 42 operates to provide a protruding sensing surface for engagement by fingertip 18, while other external portions of the packaging assembly to be described operate to seal and protect yet other internal portions of a fingerprint sensing device in accordance with the spirit and scope of this invention.

Prior to the attachment of silicon substrate member 42 and its IC device 1 to bottom laminate member 56, substrate member 42 is processed as will now be described relative to FIGS. 6 and 7.

As will be apparent, the top surface topography of silicon substrate member 42, that is the topography that comprises (1) the low, coplanar, and encircling border area 43–46, (2) the generally centered and upward tapered area 49–52, (3) and the topmost dome area 48, allows placement of solder bonding pads, circuit connections, and the like, at a protected distance below a top sensor surface that is formed by a flexible, low dielectric constant, and protective laminate 76 (to be described) that provides a flexible protective cover for the above described IC device 1 that is physically supported at the top surface 48 of dome 47.

Figure 6:
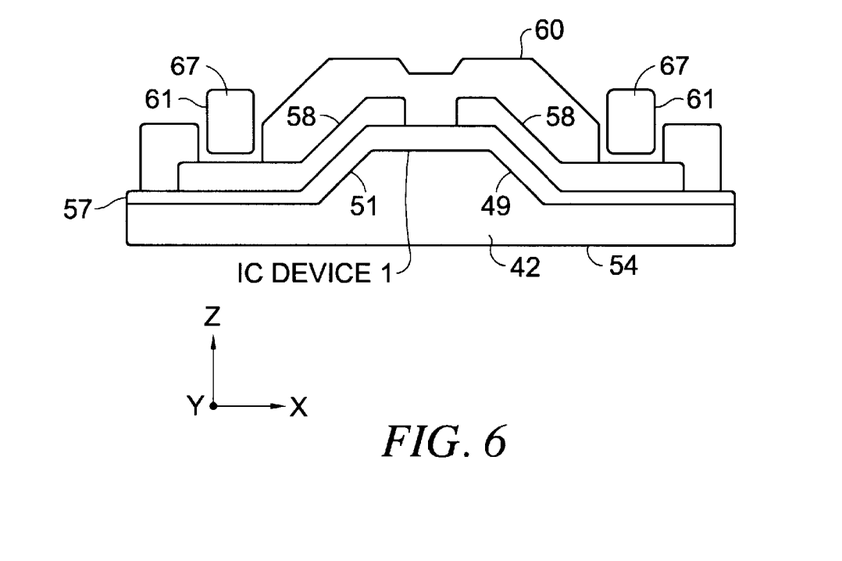
FIG. 6 is a side view that is used to explain processing of the silicon substrate member of FIGS. 4 and 5 prior to attachment of the substrate member to the bottom rigid laminate member of FIGS. 4 and 5, FIG. 6 also showing the use of two conductor/solder-bump pairs to provide electrical connection to the IC device that is shown in FIG. 1.

In construction of the arrangement shown in FIG. 6, the top surface 48 of dome 47, that is the surface that includes the above-described array 3 of sensing cells 2 and the circuits of FIG. 2, is masked and then machined, by etching, to thereby recess silicon substrate 42 in the border areas 43–46 and inclined areas 49–52, prior to deposit of intermetal dielectric layer 57.

Deposition of layer 57 can be carried out by the deposition of a first layer of low temperature oxide (for example, a TEOS or a silane based chemical), planarization of this first oxide layer by a coat of Spin On Glass (SOG), followed by etchback using a chemical that operates to etch the SOG and the first layer of low temperature oxide at about the same rate, followed by capping the thus planarized surface with a second layer of low temperature oxide. The final Z-direction thickness of layer 57 is in the range of from about 0.6 to about 2.0 micrometers.

Vias are now opened in layer 57 by conventional means.

As the next step in the FIG. 6 process, a number of metal conductor paths 58 are provided. FIG. 6 shows two such conductor paths 58, whereas the top view of FIG. 7 shows the alternative use of four conductor paths 58 As is well known, conductor paths 58 are provided in sufficient number to provide the needed electrical connection to sensor array 3 and the FIG. 2 circuits described above. The portions of conductor paths 58 that extend over recessed portions 43–46 of substrate member 42 are used to define bonding pads.

A passivation layer 60 is now coated on top of the above-described assembly, this layer having a number of openings 61 equal to a number of bonding pads, or solder bumps 67, that are then formed by conventional electroplating. As shown in FIGS. 6 and 7, one solder bump 67 is provided for each conductor path 58. Passivation layer 60 is preferably formed of nitride, and layer 60 is in the range of about 0.3 to about 0.7 micrometers thick in the z-direction.

Figure 7:
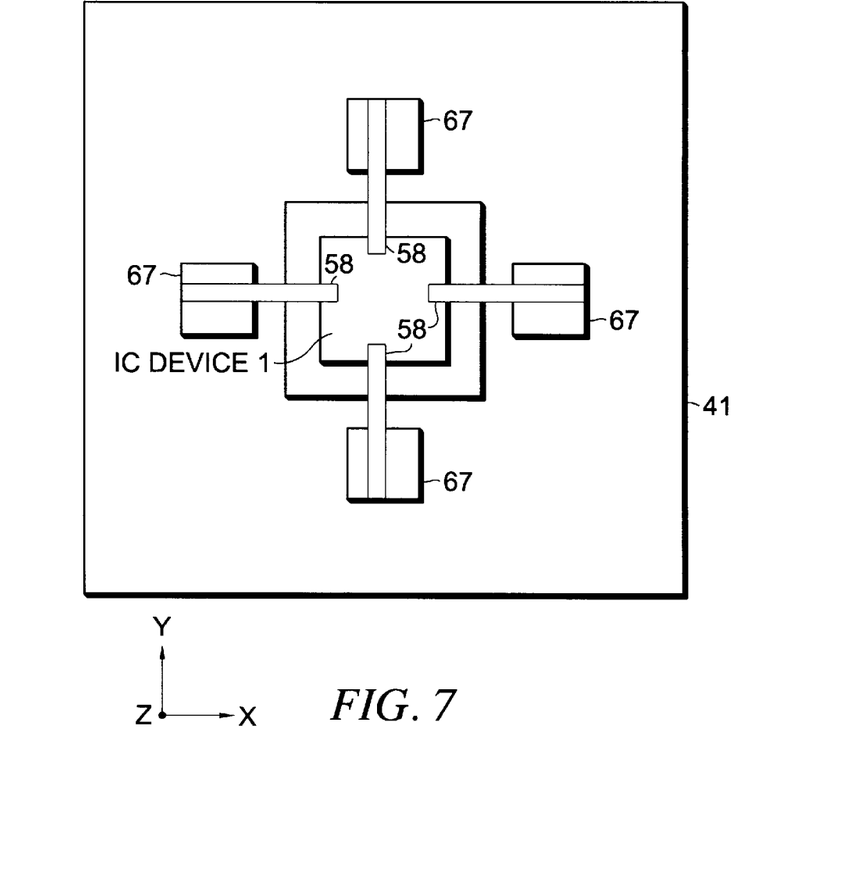
FIG. 7 is a top view that shows the alternative use of four conductor/solder-bump pairs to provide electrical connection to the IC device that is shown in FIG. 1.

As a final and optional step of the FIG. 6,7 process, the bottom surface 54 of substrate member 42 may be thinned down using conventional back-grinding techniques.

Figure 8:
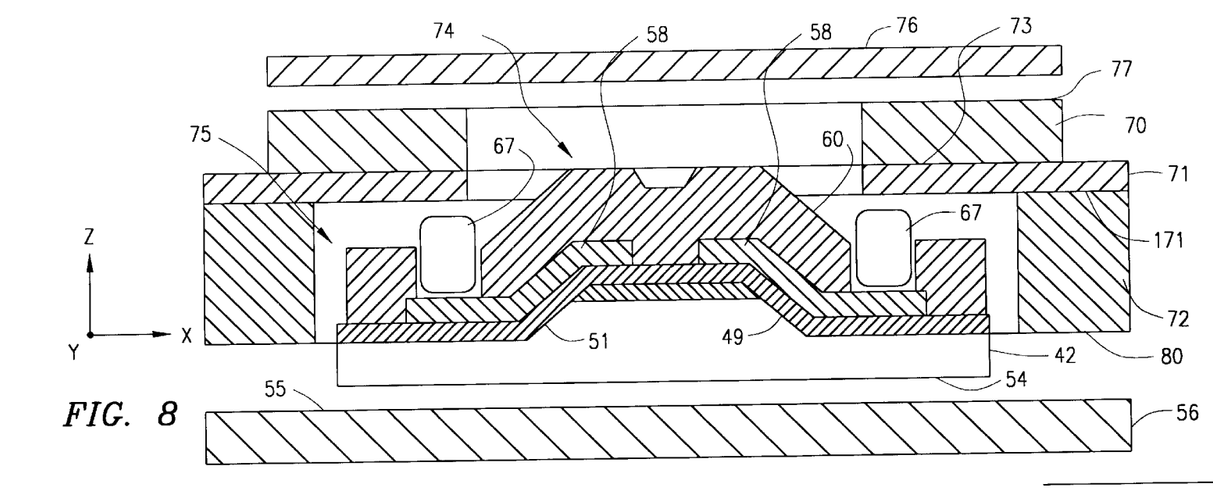
FIG. 8 is a exploded side view of a final packaged device in accordance with the present invention, this figure showing the arrangement of FIG. 6 vertically separated from the support laminate that is shown in FIGS. 4 and 5, and this figure also showing a two-piece chip card carrier assembly, a metal conductor layer, and a topmost thin and flexible protective laminate, all of which operate to protectively encase the assembly of FIG. 6.
Figure 9:
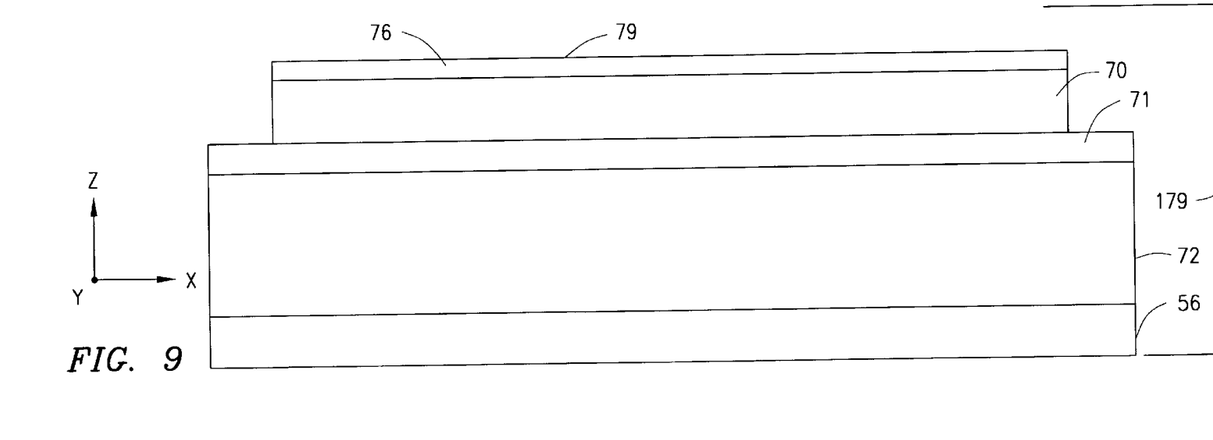
FIG. 9 is a side assembled view of a final packaged device in accordance with the present invention.

FIG. 8 is an exploded side view of a final packaged device in accordance with the present invention. FIG. 8 shows the above-described arrangement of FIG. 6 vertically separated from the support laminate 56 that was described relative to FIGS. 4 and 5. FIG. 8 also shows a two-piece chip card carrier assembly 70,72, a metal conductor layer 71, and a thin, flexible and low dielectric constant protective laminate 76 that operate in combination to protectively seal and encase the assembly of FIG. 6. FIG. 9 is a side view similar to FIG. 8 wherein the various parts of the package or device in accordance with the present invention have been assembled.

The chip card carrier assembly may be considered to be a three-piece assembly that comprises an upper, small-area, card carrier member 70, an intermediate metal layer 71 that is fixed to the bottom surface 73 of upper card carrier member 70, and a lower, large-area, card carrier member 72 that is fixed to the bottom surface of metal layer 71. Thus, assembly 70,71,72 comprises a unitary assembly having three functional parts, having a relatively large-area and generally rectangular bottom opening 75, and having a relatively small-area and generally rectangular top opening 74. In a preferred embodiment of the invention, X-Y planar areas 74,75 were complementary rectangles, for example squares.

Card carrier members 70 and 72 are made of a noncritical electrically nonconductive and rigid structural-type plastic, for example, well-known plastics from which credit cards are made.

Metal layer 71 forms metal conductor interconnect pattern lines that are sandwiched between the two dielectric members 70,72. As is well known, patterned lines 71 cooperate with solder bumps 67 and metal conductor paths 58 to provide the external-to-internal electrical connections that are necessary for IC device 1, its array 3, and its many sensing cells 2.

Upper card carrier member 70, when viewed from the above and in the X-Y plane, is in the form of a rectangular band that has a rectangular cross section, and that has a center Z-direction through-hole 74 that is large enough to accommodate the top surface 48 of substrate dome 47 and/or the various IC sensing members that are carried by the top surface 48 of dome 47.

Lower card carrier member 72, when viewed from above and in the X-Y plane, is also in the form of a complementary rectangular band that also has a rectangular cross section. However, the rectangular band that is defined by lower card carrier member 72 is larger than that defined by upper card member 70. Thus, card carrier member 72 provides a relatively large area center Z-direction through-hole 75 that is large enough to protectively encircle the entire assembly shown in FIG. 6.

In addition, the top X-Y planar surface portion 171 of lower card carrier member 72 provides support for an externally exposed portion of metal conductor layer 71, thereby allowing for external electrical connection to be made to the internal electrical portions of the assembled package shown in FIG. 9

The assembled Z-direction thickness of upper card carrier member 70, metalization layer 71, and lower card carrier member 72 is selected so that all but the upper portion of the FIG. 6 assembly is contained within and protected by an internal cavity that is defined by openings 74 and 75, and so that only the center sensing dome portion of the FIG. 6 assembly extends to the X-Y plane of the top surface 77 of upper card carrier member 70.

FIG. 8 also shows a thin, flexible, low dielectric constant and protective laminate 76 that overlies the entire FIG. 8 assembly. Laminate 76 may be formed of a polyethylene or a similar flexible plastic material. Laminate 76 is fixed to the top surface 77 of upper card carrier member 70, as by the use of an adhesive.

Since the center sensing dome portion 47 of the FIG. 6 assembly protrudes upward to be generally coincident with the X-Y plane of the upper end of through-hole 74, laminate 76 provides intimate physical contact between fingertip 18 and the top surface of each cell 2 within array 3, thus insuring that the ridges and valleys of fingertip 18 can operate to modulate the capacitance values of the cells 2 within array 3.

The upper surface 79 of laminate 76 comprises an active surface to be physically engaged by the fingertip 18 of the finger whose fingerprint is to be detected. An exemplary Z-direction height 179 of the assembly of FIG. 9 is about 1.0 mm.

The multi-part assembly comprising flexible laminate 76, upper card carrier 70, metal layer 71, and lower card carrier 72 are secured to the assembly of FIG. 6 by operation of solder bumps 67, whereas the bottom surface 54 of substrate member 42 and the bottom surface 80 of lower card carrier 72 are fixed to the top surface 55 of rigid laminate member 56 by an adhesive type attachment.

The above detailed description of embodiments of this invention is not to be taken as a limitation on the spirit and scope of this invention, since it is apparent that those skilled in the related art will, upon reading this detailed description, readily visualize yet other embodiments that are clearly within the spirit and scope of this invention.

What is claimed is:

1. A method of packaging a capacitance fingerprint sensing array in order to physically and environmentally protect the sensing array, comprising the steps of:

providing a capacitance fingerprint sensing array;

providing a rigid substrate assembly having an encircling base area, having a dome that extends upward from said base area, and having a top area on said dome, said top area being located at a given distance above said base area;

placing said sensing array on said top area;

providing a rigid and continuous wall member having a generally planar bottom surface that is complementary to said base area, and having a generally planar top surface that is located generally at said given distance above said bottom surface;

mounting said bottom surface of said wall member to said base area;

providing a flexible membrane member having a low dielectric constant; and mounting said membrane member on said top surface of said wall member to thereby provide a low dielectric constant upper surface for physical association with a fingertip whose fingerprint pattern is to be sensed.

2. The method of claim 1 including the steps of:

providing a first electrical conductor path on said substrate assembly and connected to said sensing array; and providing a second electrical conductor path extending through said wall member and connected to said first electrical conductor path to thereby provide an external electrical connection to said first electrical conductor path.

3. A packaging apparatus for providing a closed cavity that physically surrounds a capacitance type object sensor, comprising:

a rigid substrate assembly having a base area, having a generally centrally located dome that extends upward from said base area so as to be encircled by said base area, and having a topmost located dome area that contains a capacitance type object sensor, to thereby support said object sensor at a given distance above said base area;

a rigid and continuous wall member defining encircling cavity walls providing a through-hole having a top surface and a bottom surface, said top surface being located generally at said given distance above said bottom surface;

first mounting means mounting said through-hole bottom surface on said base area to thereby locate said substrate assembly within said wall member;

a flexible membrane member having a low dielectric constant; and second mounting means mounting said membrane member on said through-hole top surface to thereby provide a closed cavity having a top surface that comprises a low dielectric constant downward deflectable surface for physical association with an object whose presence is to be sensed.

4. The apparatus of claim 3 including:

a first electrical conductor path internal to said cavity and connected to said object sensor;

a second electrical conductor path extending through said wall member;

said second electrical conductor path having an internal portion connected to said first electrical conductor path; and said second electrical conductor path having an external portion providing electrical connection to said first electrical conductor path.

5. The apparatus of claim 3 wherein said wall member comprises:

a lower encircling wall having a top surface and a bottom surface;

said lower encircling wall providing a lower cavity portion having a first size sufficient to contain said substrate assembly;

said bottom surface of said lower encircling wall being mounted on said base area;

an upper encircling wall having a top surface and a bottom surface;

said upper encircling wall providing an upper cavity portion having a second size that is smaller than said first size and is sufficient to contain said dome;

said bottom surface to said upper encircling wall being mounted on said top surface of said lower encircling wall; and said membrane member being mounted on said top surface of said upper encircling wall.

6. The apparatus of claim 5 including:

a first electrical conductor path internal of said cavity and connected to said object sensor;

a second electrical conductor path extending through said wall member;

said second electrical conductor path having an internal portion connected to said first electrical conductor path; and said second electrical conductor path having an external portion providing electrical connection to said first electrical conductor path.

7. The apparatus of claim 6 wherein said second electrical conductor path comprises:

a metal path located intermediate said upper and lower encircling walls;

said metal path having an internal metal portion connected to said first electrical conductor path; and said metal path having an external metal portion providing said electrical connection.

8. The apparatus of claim 3 wherein said wall member comprises:

a thin lower encircling wall having a top surface and a bottom surface;

said lower encircling wall defining a lower cavity portion having a first cavity area sufficient to contain said substrate assembly;

a thick upper encircling wall having a top surface and a bottom surface;

said upper encircling wall providing an upper cavity portion having a second cavity size that is smaller than said first cavity size and is sufficient to contain said dome;

an outer portion of said bottom surface of said upper encircling wall being mounted on an inner portion of said top surface of said lower encircling wall; and an inner portion of said bottom surface of said upper encircling wall forming a cavity portion overhanging said base area.

9. An apparatus for providing a closed cavity that physically surrounds, seals and protects a capacitance fingerprint pattern determining array, comprising:

a rigid substrate assembly having a base area that occupies a first horizontal plane;

said substrate assembly having a dome that extends vertically upward generally from a center of said substrate assembly so as to surrounded said dome with said base area;

said dome having a top dome area that contains said array and occupies a second horizontal plane that is generally parallel to said first horizontal plane;

said second plan being located a given distance vertically above said first plane;

a continuous wall member defining vertical cavity walls that encircle a vertically extending through-hole having a top planar and horizontal surface and a bottom planar and horizontal surface;

said top through-hole surface being generally parallel to said bottom through-hole surface;

said top through-hole surface being located vertically above said bottom through-hole surface by a distance that is generally equal to said given distance;

first sealing means mounting said bottom through-hole surface on said base area to thereby encircle said substrate assembly with said vertical cavity walls;

a flexible membrane member having a low dielectric constant; and second sealing means mounting said membrane member on said top through-hole surface to thereby cover said substrate assembly and provide a low dielectric constant flexible surface for physical association with a fingertip whose fingerprint pattern is to be determined.

10. The apparatus of claim 9 including:

a first electrical conductor path associated with said substrate assembly and connected to said array;

a second electrical conductor path extending through said wall member;

said second electrical conductor path having a cavity-internal portion connected to said first electrical conductor path; and said second electrical conductor path having a cavity-external portion providing electrical connection to said first electrical conductor path.

11. The apparatus of claim 9 wherein said wall member comprises:

a lower encircling wall having a narrow horizontal thickness, a narrow top surface, and a narrow bottom surface;

said lower wall defining a lower cavity portion having a horizontal area sufficient to contain said substrate assembly;

an upper encircling wall having a wide horizontal thickness, a wide top surface, and a wide bottom surface;

said upper wall providing an upper cavity portion having a horizontal area sufficient to contain said dome;

a horizontally outer portion of said wide bottom surface of said upper wall being mounted on an inner portion of said narrow top surface of said lower wall; and a horizontally inner portion of said wide bottom surface of said upper wall forming a horizontal cavity wall that vertically overhangs said base area.

12. The apparatus of claim 11 including:

a first electrical conductor path associated with said substrate assembly and connected to said array;

a second electrical conductor path extending between upper and lower walls;

said second electrical conductor path having a cavity-internal portion connected to said first electrical conductor path; and said second electrical conductor path having a cavity-external portion providing electrical connection to said first electrical conductor path.

13. An apparatus for providing an internal cavity that physically protects a capacitance type object sensor, comprising:

a planar support member having a top horizontal surface of a first size;

a semiconductor substrate having a bottom horizontal surface of a second size that is less than said first size;

first mounting means mounting said bottom horizontal surface of said substrate generally centered upon said top horizontal surface of said support member, to thereby provide an exposed edge portion of said top horizontal surface of said support member;

said substrate having a top surface topography providing a horizontal and planar edge surface, and an upwardly tapered surface that terminates at a generally center disposed, planar, and top horizontal dome surface that contains a capacitance type object sensor;

said planar dome surface being located a given distance above said exposed edge portion of said top horizontal surface of said support member;

a vertically extending and continuous wall member defining an encircling cavity wall providing a through-hole having a top horizontal surface and a bottom horizontal surface, said top surface being located generally at said given distance above said bottom surface;

second mounting means mounting said through-hole bottom surface on said edge exposed portion of said top horizontal surface of said support member, to thereby locate said substrate and said object sensor within said through-hole;

a flexible membrane member having a low dielectric constant; and third mounting means mounting said membrane member on said through-hole top surface to thereby provide a low dielectric constant downward flexible surface that closely overlies said capacitance type object sensor.

14. The apparatus of claim 13 including:

a first electrical conductor path on said upwardly tapered surface of said substrate, and electrically connected to said capacitance type object sensor;

a second electrical conductor path extending through said cavity wall;

said second electrical conductor path having an internal portion connected to said first electrical conductor path; and said second electrical conductor path having an external portion providing electrical connection to said first electrical conductor path.

15. The apparatus of claim 14 wherein said cavity wall comprises:

a lower encircling wall having a horizontal top surface and a horizontal bottom surface;

said lower encircling wall providing a lower cavity portion having a first size sufficient to contain said substrate assembly;

said bottom horizontal surface of said lower encircling wall being mounted on said edge exposed portion of said top horizontal surface of said support member;

an upper encircling wall having a top horizontal surface and a bottom horizontal surface;

said upper encircling wall providing an upper cavity portion having a second size that is smaller than said first size and sufficient to contain said upwardly tapered surface and said top horizontal dome surface;

said bottom horizontal surface of said upper encircling wall being mounted on said top horizontal surface of said lower encircling wall; and said membrane member being mounted on said top horizontal surface of said upper encircling wall.

16. The apparatus of claim 15 wherein said second electrical conductor path comprises:

a metal path located intermediate said upper and lower encircling walls;

said metal path having an internal metal portion connected to said first electrical conductor path; and said metal path having an external metal portion.

17. The apparatus of claim 14 wherein said cavity wall comprises:

a lower horizontally narrow encircling wall having a top horizontal surface and a bottom horizontal surface;

said narrow encircling wall defining a lower cavity portion having a first horizontal cavity area sufficient to contain said substrate;

an upper horizontally-wide encircling wall having a top horizontal surface and a bottom horizontal surface;

said wide encircling wall defining an upper cavity portion having a second horizontal cavity size that is smaller than said first cavity size, and is sufficient to contain said upwardly tapered surface and said top horizontal dome surface;

a horizontally outer portion of said bottom surface of said wide encircling wall being mounted on a horizontally inner portion of said top surface of said narrow encircling wall; and a horizontally inner portion of said bottom surface of said wide encircling wall forming a horizontally extending cavity wall that vertically overhangs said horizontal and planar edge surface of said substrate.

18. The apparatus of claim 17 including:

a first electrical conductor path on said upwardly tapered surface of said substrate, and electrically connected to said capacitance type object sensor;

a second electrical conductor path extending horizontally between said wide encircling wall and said narrow encircling wall;

said second electrical conductor path having an internal portion connected to said first electrical conductor path; and said second electrical conductor path having an external portion providing electrical connection to said first electrical conductor path.

19. An apparatus for providing a cavity that physically surrounds and protects a solid-state capacitance fingerprint pattern determining array, comprising:

a rigid support member having a base surface that occupies a first horizontal plane;

a flat-top dome extending vertically upward generally from a center of said base surface;

said flat-top dome containing said solid-state array and occupying a second horizontal plane that is generally parallel to said first horizontal plane and is located a given distance vertically above said first horizontal plane;

an encircling wall member providing a vertically extending through-hole having a top horizontal and planar surface and a bottom horizontal and planar surface;

said top through-hole surface being generally parallel to said bottom through-hole surface, and said top through-hole surface being located vertically above said bottom through-hole surface by a distance that is generally equal to said given distance;

first sealing means mounting said bottom through-hole surface on said base area to thereby encircle said flat-top dome;

a flexible membrane member having a low dielectric constant;

second sealing means mounting said membrane member on said top through-hole surface to thereby cover said flat-top dome and provide a low dielectric constant flexible surface for physical association with a fingertip whose fingerprint pattern is to be determined;

a first electrical conductor path associated with said base member and said flat-top dome and connected to said solid-state array;

a dielectric passivation layer covering said first electrical conductor path and said solid-state array;

a via formed in said dielectric passivation layer so as to physically expose a portion of said first electrical conductor path;

a second electrical conductor path extending through said encircling wall member;

said second electrical conductor path having a portion that terminates adjacent to said base member; and electrical connection means extending from said portion of said first electrical path to said portion of said second electrical path.

20. The method of claim 1 wherein the membrane member provides a low dielectric constant upper surface for capacitively coupling said sensing array to said fingertip whose fingerprint pattern is to be sensed.

* * * * *